United States Patent

Cocchi et al.

[11] Patent Number: 6,119,905
[45] Date of Patent: Sep. 19, 2000

[54] HAND-ACTUATED DISPENSING TAP FOR ICE-CREAM MACHINES

[75] Inventors: Gino Cocchi, Bologna; Giancarlo Pietra, Castello Di Serravalle, both of Italy

[73] Assignee: ALI S.p.A., Italy

[21] Appl. No.: 08/899,661

[22] Filed: Jul. 24, 1997

[30] Foreign Application Priority Data

Jul. 31, 1996 [IT] Italy ............................... GE960026 U

[51] Int. Cl.⁷ .................................................. B22D 37/00
[52] U.S. Cl. .......................................... 222/509; 222/518
[58] Field of Search .................................. 222/509, 518, 222/559

[56] References Cited

U.S. PATENT DOCUMENTS 4,478,355  10/1984  Houman .
5,463,877  11/1995  Young et al. .

Primary Examiner—Gregory L. Hudson
Attorney, Agent, or Firm—Larson & Taylor, PLC

[57] ABSTRACT

Device for automatically closing the plungers of the plunger-type dispensing taps of machines for dispensing ice cream, crushed ice drinks or the like. At the end of each plunger is a push rod pushed into permanent contact with the end of the plunger by a spring, this spring being loaded by the raising of the plunger by hand, so that when the lever is released, this spring, acting through the push rod, automatically pushes the plunger down to block the dispensing of the dispensed product.

2 Claims, 3 Drawing Sheets

HAND-ACTUATED DISPENSING TAP FOR ICE-CREAM MACHINES

BACKGROUND AND SUMMARY OF THE INVENTION

The invention relates to machines for dispensing ice cream, crushed ice drinks or the like to the public, and specifically it relates to the hand-actuated plunger-type dispensing taps for such machines.

Hand-actuated dispensing taps in which the shutoff member is a plunger, as used in machines for dispensing ice cream or similar substances such as, e.g. crushed ice drinks, are worked by hand both to open and close them by turning a lever to raise and lower the plunger. The necessity of returning the plunger by hand to the closed position after each dispensing operation can be a nuisance during periods of heavy public demand. This nuisance is especially acute, for example, when using machines with more than one dispensing plunger, where the operator cannot move to another plunger without first completely closing the plunger actuated previously.

It is therefore the main object of the invention to provide a device which is able to cause said plunger to be automatic returned to the closed position after each dispensing operation.

From U.S. Pat. No. 4,478,355 a soft dessert dispensing arrangement is known comprising a manually actuated dispensing lever, a plunger spring biased closed, said plunger being mechanically coupled to said dispensing lever to be moved thereby to an open position in opposition to the action of said spring means, means for holding said plunger in its lifted position, and means actuated at the end of a timing period to cause said holding means to release said plunger, thereby causing said plunger to be spring biased closed.

However, the said device cannot be fitted to existing plunger type dispensing taps without consistent structural modifications both to the taps and to the machine.

It is therefore the main object of the present invention to provide an automatic device that can also be fitted to existing plunger-type dispensing taps on ice cream dispensing machines without making any structural modification to the latter and which enables the plungers of these taps to return to the closed position automatically.

The subject of the invention is a device that can be fitted to the dispensing plungers of a machine for dispensing ice cream or the like which makes it possible, after the dispensing plunger has been raised by hand to the dispensing or open position, to execute the subsequent operation of lowering or closing this plunger entirely automatically as soon as the manual action of raising the plunger ceases. For this purpose, at the end of each plunger there is a push means fitted with a compression spring which is loaded by the raising of the plunger by means of a hand-operated lever, and which automatically moves the plunger back in the opposite or closing direction as soon as the hand releases this lever.

BRIEF DESCRIPTION OF THE DRAWINGS

A concise description of a non-limiting embodiment of the invention will now be given with reference to the attached drawings, in which.

DESCRIPTION OF THE PREFERRED EMBODIMENT OF THE INVENTION

Figure 1:
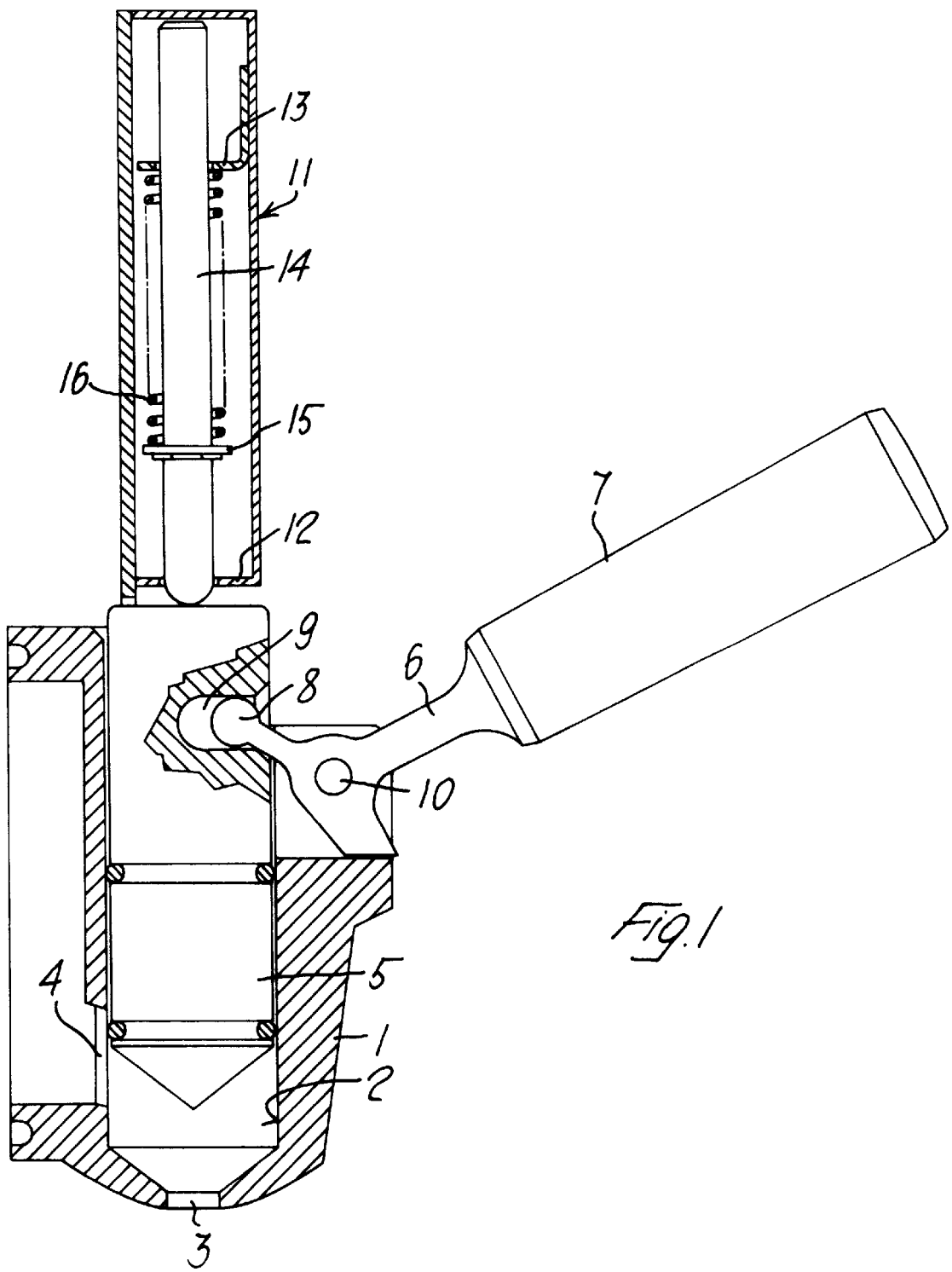
FIG. 1 is a view in longitudinal section of a dispensing plunger fitted with the device for lowering it according to the invention, in the position in which the plunger is in the raised or dispensing position and the plunger return rod has been driven up in opposition to the action of its spring.
Figure 2:
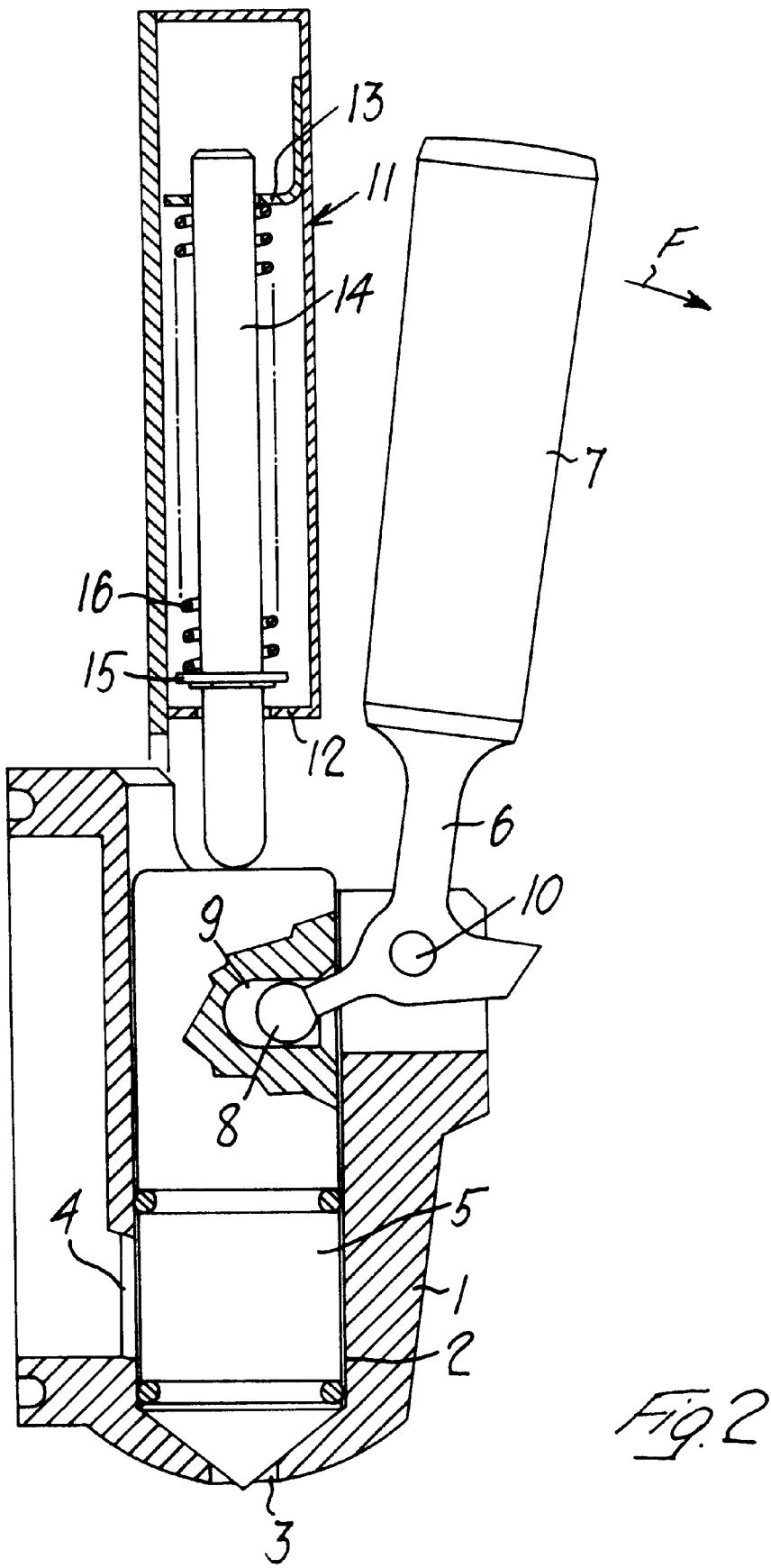
FIG. 2 is a view in longitudinal section similar to FIG. 1, in which the plunger has been returned to the closed position by the action of the spring-loaded rod.
Figure 3:
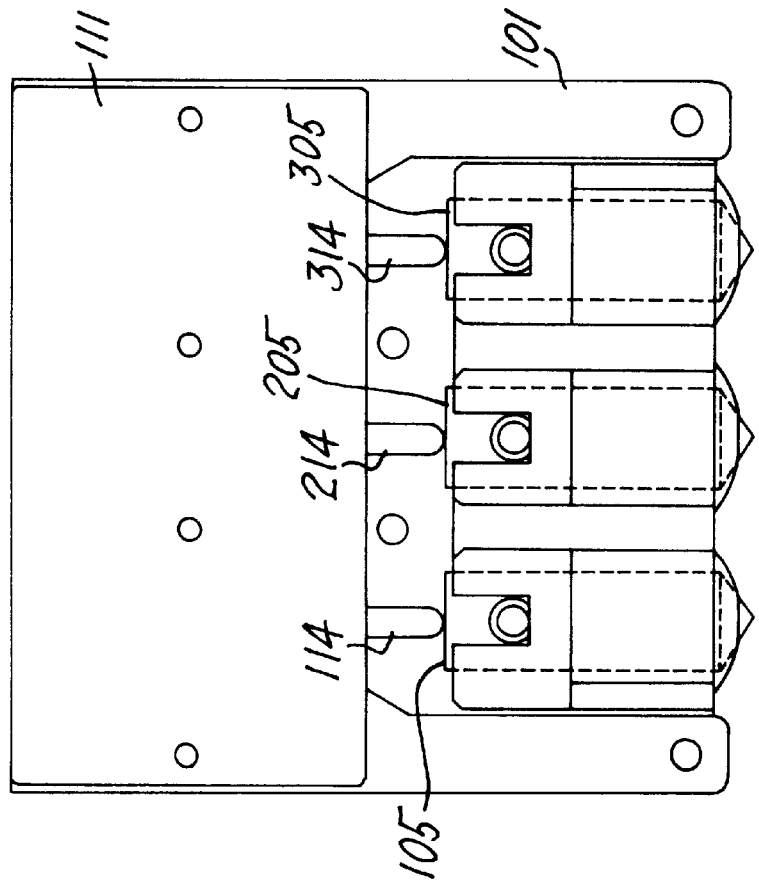
FIG. 3 is a front view of a front plate with a single plunger fitted with the device shown in FIGS. 1 and 2.

With reference to the drawings, and with particular reference to FIGS. 1 to 3 of these, the device illustrated comprises, a front plate 1 designed to be fixed to the front of the mixing cylinder (not shown) of an ice cream making machine.

This front plate 1 has a cylindrical hole 2 terminating at the bottom with a hole 3, of smaller diameter, through which the ice cream is dispensed and provided at its side, close to its bottom, with a hole 4 connecting it to the mixing cylinder. Mounted inside the cylindrical hole 2 is a plunger 5 which is operated by a lever 6 with a handle 7 and a tooth 8 engaged in a recess 9 in the plunger 5. The lever 6 pivots at 10 on the front plate 1.

According to the invention, the device for automatically reclosing the plunger 5 is mounted on top of the front plate 1. This device comprises, as shown, a casing 11 that has a bottom wall 12 and an intermediate wall 13. Both the wall 12 and the wall 13 have a coaxial hole through which passes and is guided a rod 14. The rod 14 possesses at an intermediate point a collar or other stop means 15, while the two ends of a helical compression spring 16 wound around the rod 14 are held between this collar 15 and the bottom of the wall 13.

The casing 11 is fastened to the housing (not shown) of the ice cream machine in such a way that the rod 14 is coaxial with the plunger 5, and the end of the rod 14 projecting from the casing 11 presses permanently on the centre of the end of the plunger 5.

The operation of the device described above will be obvious.

With reference to FIG. 2, which shows the rest position of the dispensing plunger 5, when the operator wishes to dispense a serving of ice cream he acts on the handle 7, pressing it down in the direction of the arrow F. This action raises the plunger 5, which rises into the position shown in FIG. 1, i.e. the ice cream dispensing position. At the same time the rod 14 bearing down on the end of the plunger 5 is carried up by the latter in opposition to the action of the spring 16, which as a result is loaded (the position of FIG. 1).

It will be obvious that as soon as the handle 7 is released, the rod 14, pushed by the spring 16, will automatically return the plunger 5 to the initial position of FIG. 2.

Figure 4:
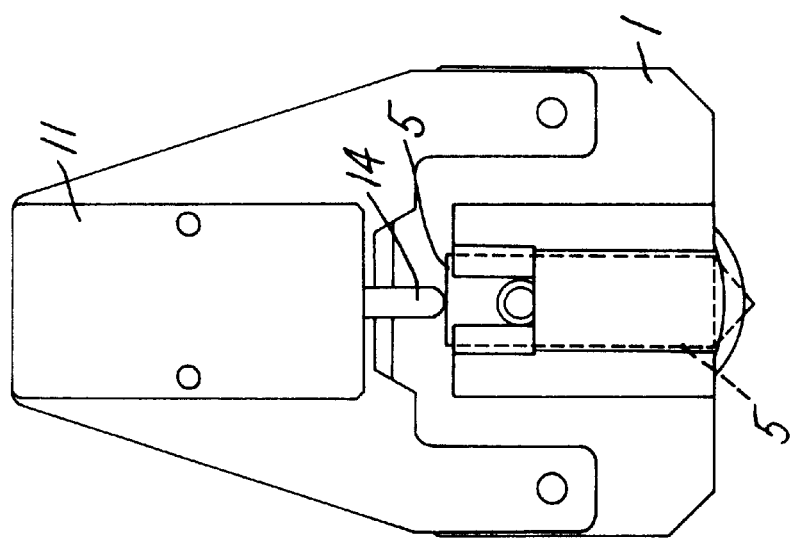
FIG. 4 shows a front view of a device according to the invention fitted to a multiple front plate containing three dispensing plungers.

Illustrated in FIG. 4 is a triple front plate 101 having a triple device 111 fitted with three rods 114, 214, 314 for returning the plungers 105, 205, 305. This works in exactly the same way as has been described in relation to the single front plate of FIGS. 1 to 3.

What is claimed is:

1. A frozen product making machine comprising:
   one or more freezing chambers for the manufacture of a frozen flowable product;

a front plate which closes the freezing chambers and in which is housed one or more cylinders, each of said cylinders communicating at a bottom thereof with the exterior through a delivery port and at a side thereof with the interior of one or more freezing chambers through an inlet port;

a plunger housed in each of said cylinders with a rear end thereof projecting from an upper end of said cylinder;

hand-operated lever means for freely reciprocating said plungers between a down position in which said inlet port and delivery port are both closed and an up position in which said inlet and delivery port are both opened and the frozen product is dispensed from the inlet port through said delivery port; and a self-contained device for automatically urging said plungers into the closed position and being adapted for connection to said front plate, said device comprising a respective push rod in permanent contact with the respective rear end of each respective said plunger, said push rod being mounted for free movement with said plunger caused by said lever means;

respective spring means for constantly urging the respective said push rods into contact with said rear end of respective said plungers, said spring means being loaded by the moving of said plungers to the up position by said hand-operated lever means, so that as soon as said lever means are released, said spring-loaded push rods automatically push the plungers to said down position thus blocking the dispensing of the frozen product.

2. The machine according to claim 1, wherein said device further includes a casing that has a bottom wall and an intermediate wall, both said walls having coaxial holes through which passes and is guided said push rod, wherein said push rod includes at an intermediate point a stop collar, and wherein said spring means includes a helical compression spring wound around the push rod and held between said collar and the intermediate wall.

* * * * *